March 9, 1965 A. B. MOJONNIER 3,172,927
METHOD AND APPARATUS FOR MOLDING PLASTIC ARTICLES
Filed Aug. 22, 1962 5 Sheets-Sheet 1
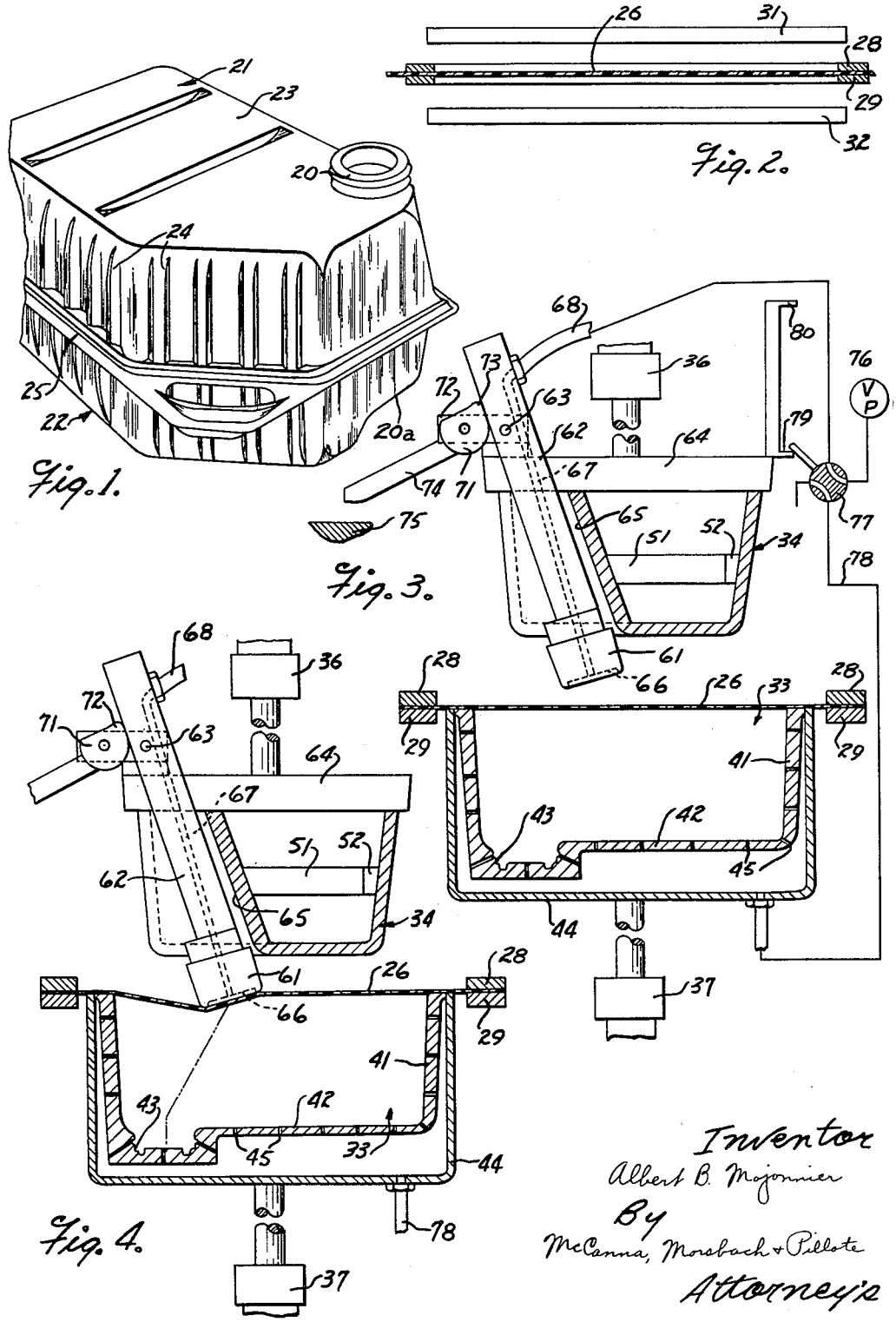
Inventor
Albert B. Mojonnier
By
McCanna, Morsbach & Pillote
Attorneys

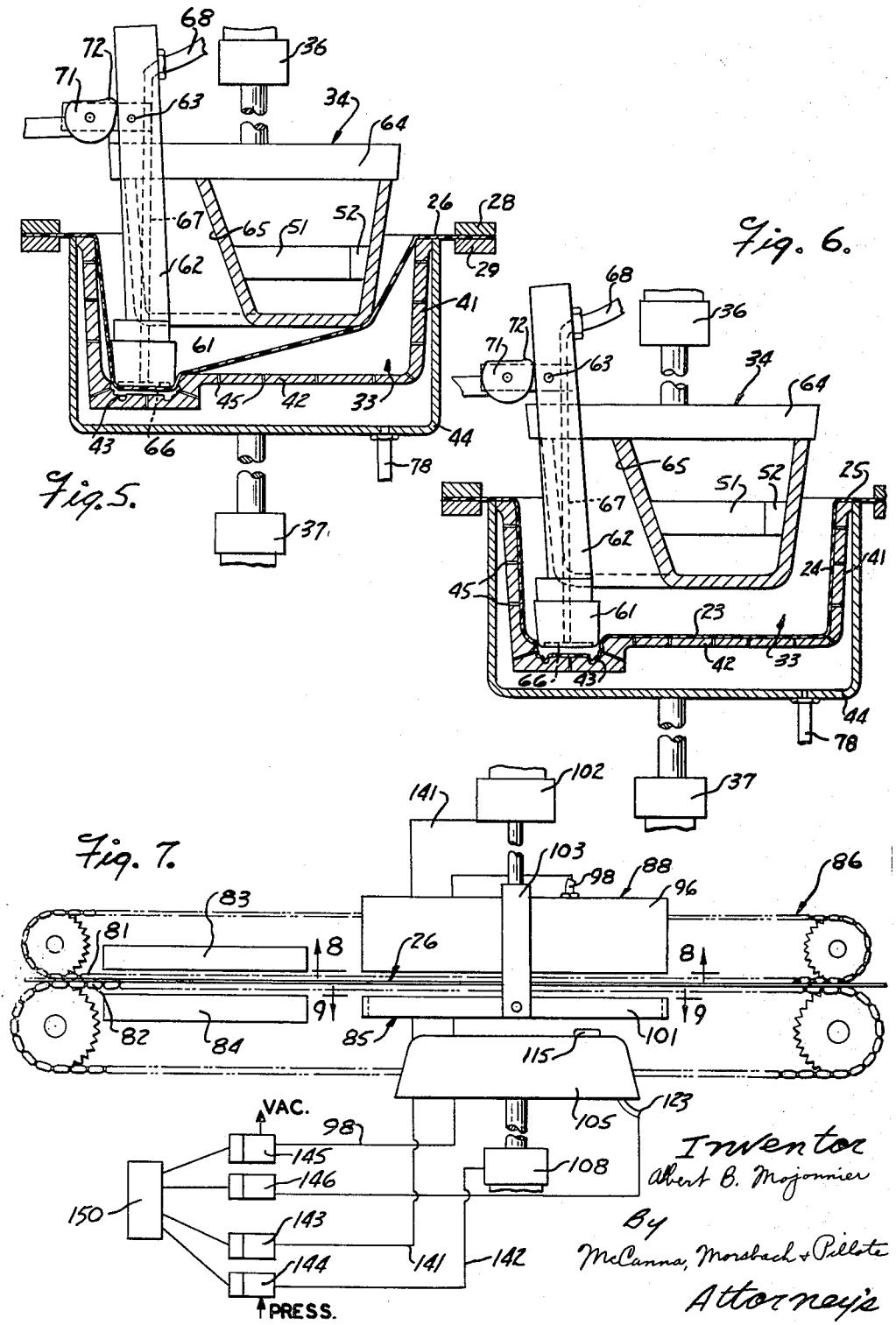

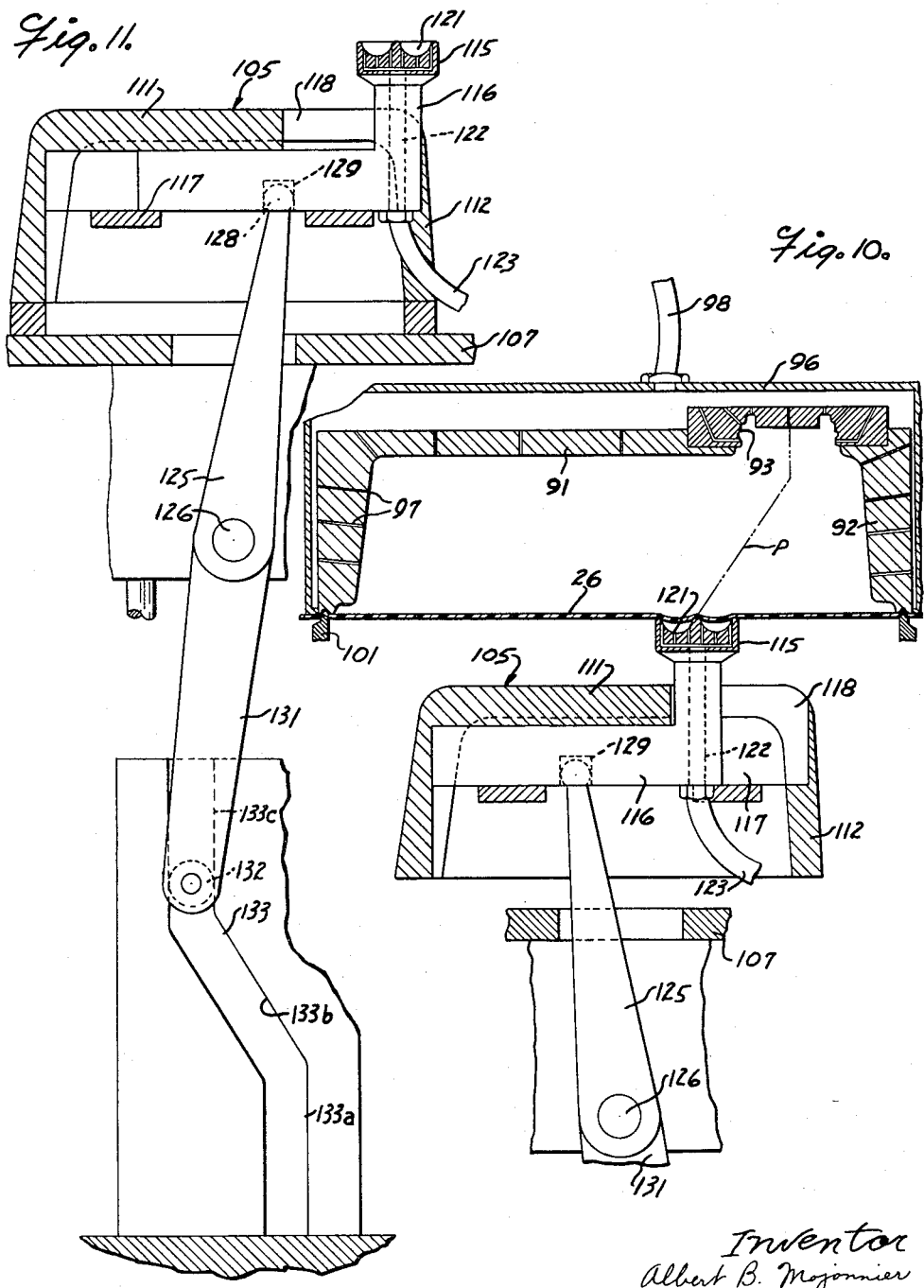

March 9, 1965    A. B. MOJONNIER    3,172,927
METHOD AND APPARATUS FOR MOLDING PLASTIC ARTICLES
Filed Aug. 22, 1962    5 Sheets-Sheet 5

Inventor
Albert B. Mojonnier
By
McCanna, Morsbach & Pillote
Attorneys

United States Patent Office 3,172,927
Patented Mar. 9, 1965

3,172,927
METHOD AND APPARATUS FOR MOLDING
PLASTIC ARTICLES
Albert B. Mojonnier, Chicago, Ill., assignor to Albert
Mojonnier, Inc., Chicago, Ill., a corporation of Illinois
Filed Aug. 22, 1962, Ser. No. 218,714
20 Claims. (Cl. 264—92)

This invention relates to an improved method and apparatus for forming articles from thermoplastic material.

It is sometimes necessary or desirable to form plastic articles having protuberances, bosses, or localized areas with relatively greater thickness than the adjacent areas on the article. Various different methods for thermoforming articles from plastic sheet material have been developed, such as drape forming; vacuum forming; and plug-assist forming. In applying these different methods, different techniques such as controlling the heat distribution during heating of the sheet and controlling the size and shape of the plug in the plug-assist method, have been used in order to aid in controlling the distribution material in the formed article. While these different methods and techniques enable some control over the general distribution of the sheet material in the formed article, they are not entirely satisfactory in producing articles which have localized protuberances or which require localized areas of relatively greater thickness. In the prior methods and techniques, the protuberances or bosses were merely formed from material which existed in the area of the protuberance or boss, and this frequently resulted in excessively thin sections either in the protuberance or in the area immediately adjacent thereto.

An important object of this invention is to provide a method and apparatus for forming articles from thermoplastic sheet material and which enables improved control of the distribution of the material in the formed article.

Another object of this invention is to provide a method and apparatus for forming articles from thermoplastic sheet material wherein the articles have localized protuberances, bosses or reinforced areas of adequate strength and rigidity.

Another object of this invention is to provide a method and apparatus for forming articles from thermoplastic sheet material in which material from one area of the thermoplastic sheet is effectively transferred or shifted to a relatively different area during forming of the article, to provide adequate material thickness in a selected area for localized reinforcing; protuberances or bosses in the formed article.

A further object of this invention is to provide an improved plug-assist type apparatus for forming thermoplastic sheets in which the assist-plug functions to control the general distribution of material between the side and end walls of the carton and in which additional means is provided for shifting material from one localized area to another during forming of the article, to thereby provide additional material in localized areas as may be necessary to reinforce parts of the article or form protuberances, bosses or the like.

Yet another object of this invention is to provide a plug-assist type apparatus in accordance with the foregoing object in which the movement of the assist plug and the means for shifting material are effected automatically and in timed relation to each other.

A more particular object of this invention is to provide a plug-assist type apparatus for forming articles from thermoplastic sheet material, in which the assist plug has at least one sheet engaging member movable relative to the assist plug in a direction transverse to the direction of movement of the assist plug, to shift a portion of the sheet in a direction transverse to the direction of draw produced by the assist plug.

These, together with other objects and advantages of this invention will be more readily understood by reference to the following detailed description, when taken in connection with the accompanying drawings wherein:

FIG. 1 is a perspective view illustrating one type of article which can be formed by the method and apparatus of the present invention;

FIG. 2 is a diagrammatic view illustrating the step of heating the sheet of thermoplastic material;

FIG. 3 is a diagrammatic sectional view illustrating the heat softened sheet of plastic material applied to a forming mold and with the assist-plug and material shifting means in the retracted position;

FIG. 4 is a diagrammatic sectional view illustrating the relative position of the forming mold, the thermoplastic sheet, the assist plug and the material shifting means at the time the latter engages the sheet;

FIG. 5 is a diagrammatic sectional view illustrating the relative position of the forming mold, the assist plug and the material shifting means at the completion of the drawing operation;

FIG. 6 is a diagrammatic sectional view illustrating the sheet stripped off the assist plug and pressed against the forming mold to be shaped and cooled thereby;

FIG. 7 is a diagrammatic view illustrating a modified arrangement for supporting the sheet during heating and for conveying the heat softened sheet to the forming station;

FIG. 10 is a diagrammatic sectional view taken on the plane 10—10 of FIG. 9 and illustrating the relative position of the forming mold, the sheet, and the assist plug and the laterally movable plug element at the time the latter engages the sheet;

FIG. 11 is a diagrammatic sectional view illustrating the operating mechanism for shifting the laterally movable plug element relative to the assist plug during movement of the latter;

Figure 8:
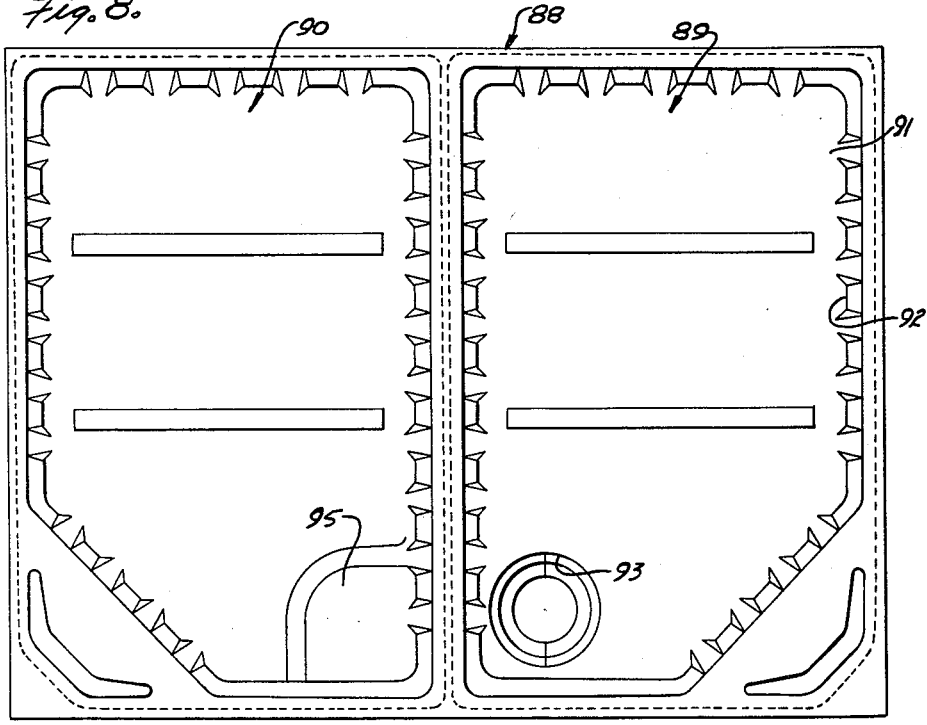
FIG. 8 is a sectional view taken on the plane 8—8 of FIG. 7 and illustrating the forming mold.

The present invention is directed to the forming of articles from thermoplastic material, and particularly to the forming of articles having protuberances, bosses or localized reinforced areas. The present method may, for example, be used in forming articles of the type shown in FIG. 1. The container illustrated therein includes upper and lower halves designated 21 and 22, and each half includes a face wall such as 23 and a peripheral side wall 24. A spout 20 is formed on the upper container half and a spout receiving depression 20a is formed in the lower container half for receiving the spout on a subjacent carton when the cartons are stacked. The container halves are formed separately, and the halves are then joined along a mating outturned flange 25, as by a heat sealing operation. In the forming of the container illustrated in FIG. 1, particular difficulties were encountered in achieving adequate thickness and strength in the spout 20 and in the areas of the carton adjacent the spout. As shown, the spout is located in a corner and insufficient material remained, after drawing of the main body of the carton into the cavity, to enable proper forming of the corner spout. In accordance with the present invention, material is shifted from one area of the sheet over to the area from which the corner spout is formed, during forming of the article, to provide adequate material in this area for forming of the spout.

Since the cost of the plastic raw material forms a considerable part of the total cost of the article, it is highly desirable to minimize the overall amount of material employed in making the article, consistent with providing adequate strength and rigidity. This requires close control of the thickness of the various different parts of the article. In general, it has been found that more accurate control over the wall thickness in the formed article can be achieved by employing sheet plastic material, the initial thickness of which sheets can be accurately controlled, and to then control the drawing and forming of the sheets to attain the desired distribution of the sheet material in the different parts of the article.

The sheet material, designated generally by the numeral 26, may be formed in any conventional manner and, while the sheet is herein shown as having a uniform thickness, it may, for certain applications, be formed with areas of relatively different thickness. The sheet of thermoplastic material must be heat softened before forming into the article. It is apparent that the sheet may be formed into the article while the sheet is still in a heat softened condition from the apparatus which initially produces the sheet or, as shown in the drawings, the sheet 26 may be supported as by clamps 28 and 29 and heated as by one or more heaters 31 and 32, of conventional construction. In order to reduce the overall time required for heating and to provide more uniform heating of the sheet material, it is preferable to employ dual heaters arranged at opposite sides of the sheet as shown in FIG. 2.

When forming articles have a relatively deep cavity, such as the container halves previously described, the present invention is advantageously employed in conjunction with the so-called plug-assist method of forming articles from thermoplastic sheet material. The plug-assist apparatus includes a female mold member 33, a means such as the clamps 28 and 29 for clamping the heat softened sheet 26 to the mold, and a male mold member 34 commonly referred to as an assist plug. Any suitable mechanism may be provided for effecting relative movement of the mold, sheet and assist plug in a direction transverse to the sheet to bring the mold into engagement with one side of the sheet and to move the assist plug into the mold cavity from the other side of the sheet and, as diagrammatically shown in FIGS. 3–6, fluid pressure operators 36 and 37 are connected to the mold and the assist plug to effect movement of the same.

The mold 33 shown herein has a cavity shaped in the form of the upper container half 21 and includes side walls 41, a bottom wall 42, and a spout forming recess 43 herein shown located in one corner of the mold cavity. Apparatus is provided for applying fluid pressure to the sheet to press the same into the mold cavity at the proper time. In the embodiment shown, a vacuum chamber 44 is disposed around the mold cavity and communicates with the interior of the cavity through openings 45 located at selected points around the mold. When the vacuum chamber is evacuated, the atmospheric pressure acts on the heat softened sheet of plastic material to press the same into conformity with the mold, it being understood that apparatus could alternatively be provided to apply above atmospheric pressure to the side of the plastic sheet opposite the mold, to press the same into conformity therewith.

In the absence of the assist plug 34, the most thinning of the sheet occurs in that portion of the sheet which has to move furthest to contact the walls of the mold cavity, generally the central portion of the sheet. The assist plug 34 is provided and arranged to control thinning of the central portion of the sheet. As is conventional, the assist-plug 34 is heated as by a heater 51 and is conveniently maintained at a temperature slightly below the temperature of the heat softened sheet, as by a thermostat 52. The assist-plug is made somewhat smaller in length, width and depth than the mold cavity, and the relative sizes of the mold cavity and plug are selected so as to achieve the desired thickness in the side and bottom walls 24 and 23 of the article. The assist plug produces a cooling effect on the central portion of the sheet and, in addition, applies pressure to the sheet in such a manner as to tend to draw their peripheral portions of the sheets somewhat greater than the central portion. This counterbalances the normal tendency of the central portion to thin excessively. While proper selection of the size and shape of this plug relative to the mold cavity enables control of the general distribution of the material between the side walls 24 and bottom wall 23 of the finished article, it is found that merely changing the shape or size of the assist plug could not provide adequate material for forming the spout 20, when the latter was located in certain areas of the carton, such as in the corner of the carton. In forming articles of this type, the corners are normally drawn relatively thin and insufficient material remained in this area to enable forming a spout such as 20 of adequate strength and rigidity.

In accordance with the present invention, material from one somewhat localized area of the sheet is shifted to the area of the sheet from which the protuberance is formed, to provide sufficient material in this last mentioned area to enable forming the protuberance and the adjacent walls of the article with adequate thickness for strength and rigidity. For this purpose, a means is provided for engaging the heat softened sheet in an area inwardly of the periphery of the sheet and for shifting the engaged area along a path having at least at substantial component paralleling the normal plane of the sheet to stretch and shift the engaged portion of the sheet to the area of the sheet from which the protuberance or the like is to be formed. This increases the effective thickness of the sheet in the last mentioned area and by proper selection of the area engaged and the distance through which the engaged portion is shifted, it is possible to shift sufficient material from one area of the sheet to another to enable forming of localized protuberances, bosses or reinforced areas, as desired. As shown in FIGS. 3–6, the assist plug 34 has a laterally movable plug element or portion 61 which is movable relative to the assist plug in a direction transverse to the direction of movement of the assist plug into the mold cavity. As shown, the relatively movable plug element 61 is mounted on an arm 62 for swinging movement about a pivot 63 carried by the support platen 64 for the assist plug. The arm 62 extends through a slot 65 in the assist plug and, preferably, projects beyond the bottom wall of the assist plug to engage the sheet 26 before the assist plug engages the same. A means is provided on the latterally shiftable plug element 61 for gripping the engaged portion of the sheet and, as shown, the plug element 61 has a cup face 66 which is connected through a passage 67 with a vacuum line 68. When the laterally movable plug element 61 engages the sheet 26, the atmospheric pressure at the other side of the sheet holds the sheet against the plug so that the engaged portion of the sheet will tend to shift with the plug element 61, as the latter is moved laterally of the main assist plug. While the vacuum operated gripper means on the plug element is advantageous and is preferred, it is apparent that other gripper means such as mechanically operated clamping fingers could be provided to engage and shift a portion of the sheet with the plug element 61 if desired.

The timing of the lateral movement of the plug element relative to the movement of the assist plug 34 into the mold cavity can be varied for different applications. Thus, the laterally movable plug element 61 may engage and move the engaged portion laterally before the assist plug 34 engages the sheet; while the assist plug 34 engages the sheet and moves it down into the mold, or after the assist plug has moved the sheet into the mold cavity. In the embodiment illustrated, the laterally movable plug element 61 engages the sheet and begins to move laterally of the plug 34 before the assist plug engages the sheet and continues the lateral movement after the assist plug engages the sheet and while the assist plug is drawing the sheet into the mold cavity, as shown in FIGS. 4 and 5.

The laterally movable plug element 61 is obviously adapted for moving material from any area of the article where the thickness is in excess of that required, to a relatively different area having insufficient mold thickness. As shown, the laterally movable plug element 61 engages the sheet 26, in the area which forms the bottom wall 23 of the article, and draws material laterally in the bottom wall to one corner. The assist plug 34 is preferably arranged to draw the sheet material during forming of the article such that the wall thickness in the bottom portion of the article is slightly greater than that required for adequate strength and rigidity in the bottom wall, and material from this area is then shifted laterally to the corner of the article. Alternatively, it is deemed apparent that material could be shifted from one area of the sheet which forms one of the walls such as the bottom wall, to a relatively different area which forms, for example, one of the side walls, if it was desired to provide the protuberance spout on one of the side walls 24 of the carton. Any suitable means may be provided for moving the plug element 61 relative to the assist plug 34, in timed relation with the movement of the latter and, as shown, a cam 71 is pivotally mounted on a bracket 72 and has a cam nose 73 shaped so as to swing the arm 62 and plug element 61, when the cam is turned about its pivot. The cam is conveniently rotated in response to descent of the plug 34, as by an arm 74 attached to the cam and which engages a stop or abutment 75 disposed in the path of movement of the arm 74, as the assist plug 34 descends. In the embodiment shown, the mold is shown moved into engagement with the underside of the heat softened sheet 26 and the assist plug 34 is thereafter moved downwardly into engagement with the sheet to draw the sheet into the mold cavity. Alternatively, the mold cavity could be positioned above and the assist plug below the sheet to press the sheet upwardly into the mold cavity. In addition, the plug can be moved into engagement with the sheet to draw the same before the mold cavity is moved into engagement with the opposite side of the sheet, if so desired.

Any suitable means, either manual or automatic, may be provided for controlling evacuating the cup 66 on the plug element 61 and the vacuum chamber 44 on the mold, in timed relation with the movement of the assist plug as diagrammatically shown in FIG. 3, a vacuum pump 76 is connected as by a reversing valve 77 and conduits 68 and 78 to the plug element 61 and vacuum chamber 44 respectively. The valve 77 is conveniently operated by fingers 79 and 80, mounted for movement with the platen 64 to connect the vacuum cup 66 on the plug element with the vacuum pump, when the plug element initially engages the shell, and to connect vacuum chamber 44 on the mold to the vacuum pump, after the assist plug has drawn the sheet into the mold cavity. Any suitable control means (not shown) may be provided for operating the cylinders 35 and 36 for moving the mold and assist plug.

Figure 9:
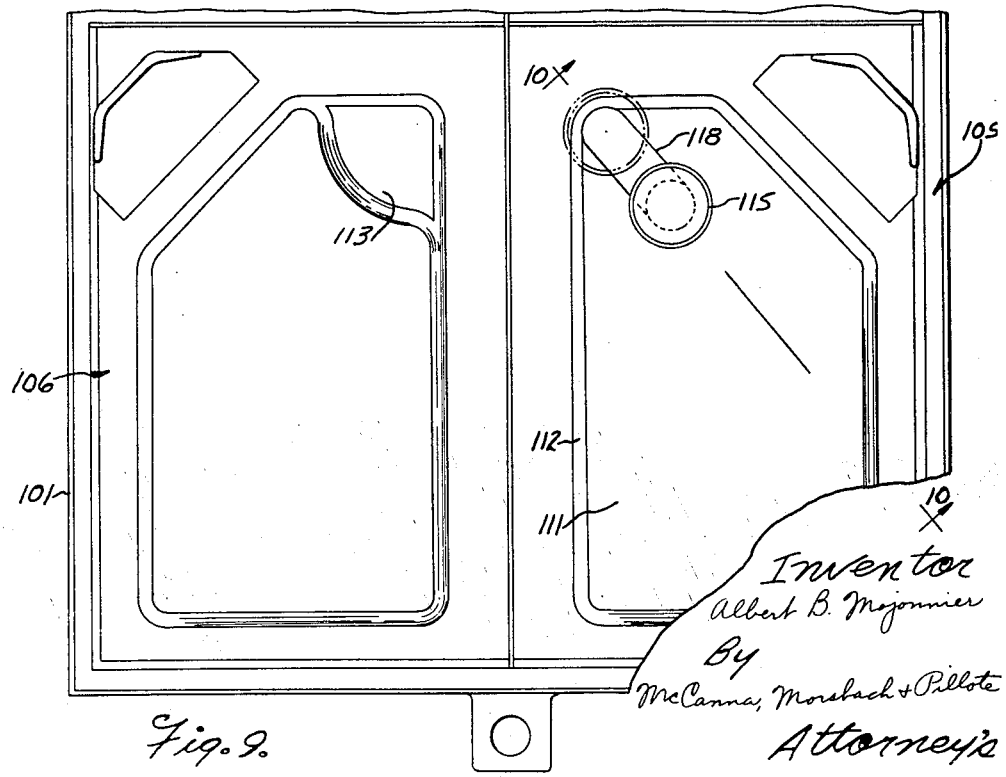
FIG. 9 is a sectional view taken on the plane 9—9 of FIG. 7 and illustrating the assist plug.
Figure 12:
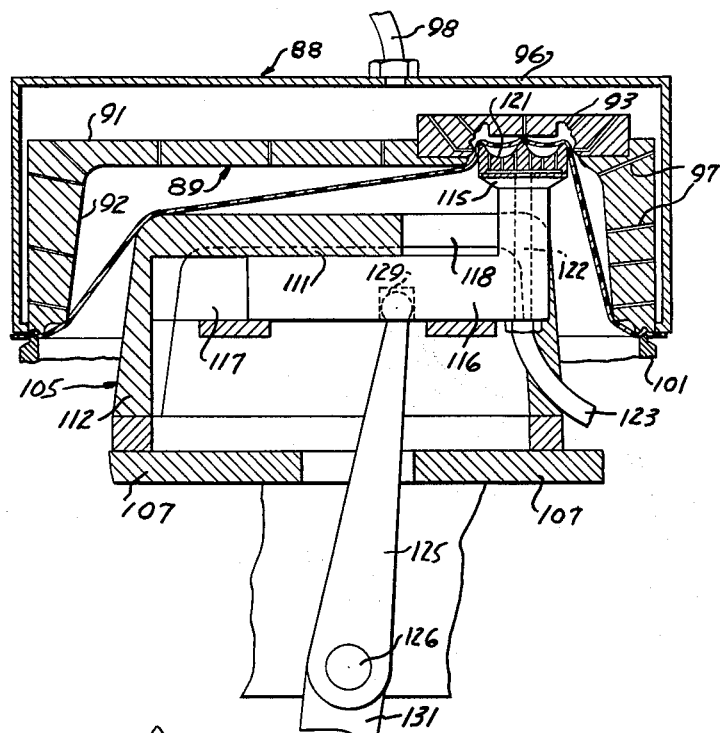
FIG. 12 is a diagrammatic sectional view taken on the plane 10—10 of FIG. 9 and illustrating the relative position of the parts at the end of the drawing operation.
Figure 13:
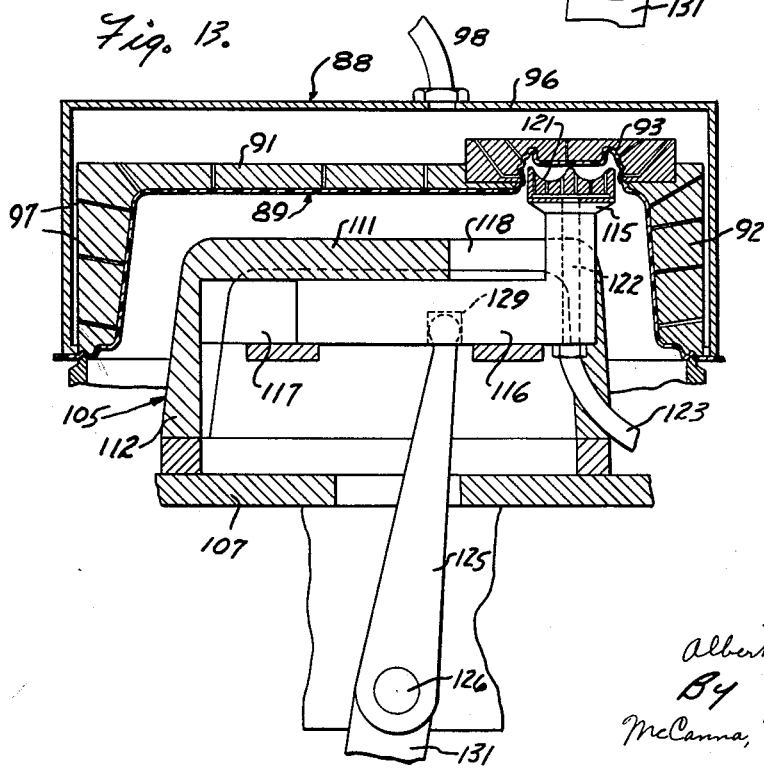
FIG. 13 is a diagrammatic sectional view taken on the plane 10—10 of FIG. 9, after evacuation of the forming mold to draw the sheet off the assist plug and press the same against the mold to shape and cool the article.

A modified form of apparatus for practicing the invention is illustrated in FIGS. 7–13. As diagrammatically shown in FIG. 7, the sheet of thermoplastic material 26 is conveyed, as between upper and lower sets of endless type conveyors 81 and 82, past the heaters 83 and 84 to the forming station 85, and from the forming station to a discharge station where the articles are blanked from the sheet for subsequent assembly or packaging. The conveyors are operated by any suitable mechanism which forms no part of the present invention and may be arranged to either intermittently step the sheet from the heating station to the forming station and to the discharge station or, alternatively, to continuously advance the sheet in which event the molding and forming apparatus must be arranged for movement with the sheet, while in engagement therewith. In this embodiment, a female mold member 88 is provided having at least two cavities designated 89 and 90 for forming the upper and lower halves of a hollow article such as the carton shown in FIG. 1. The mold cavities shown herein, are similar in shape and each include a bottom wall 91 and peripheral side walls 92. The mold cavity 89 for the upper half of the container has a spout forming recess 93, herein shown located in one corner of the cavity, while the cavity 90 for the lower half does not have such a recess but instead has a protrusion 94 for forming a spout receiving recess at the underside of the carton. As in the preceding embodiment, a vacuum chamber 96 is disposed around the molt and communicates with the mold cavity through passages 97. The upper and lower conveyors 81 and 82 function to clamp opposite sides of the sheet and hold the sheet against movement relative to the conveyors during forming of the article. However, it is preferable to also provide a stock or sheet clamp 101 for selectively clamping the sheet in fluid tight engagement with the mold cavity. As shown in FIG. 7, the sheet clamp can be selectively operated as by a fluid operator 102 which is connected to the clamp by a yoke 103.

Male mold members or assist plugs, correspond in number to the mold cavities, and designated 105 and 106 are mounted on a platen 107 for movement relative to the mold 88. It has been found advantageous in the practice of the method of the present invention to locate the mold cavities 89 and 90 above the sheet of material and to move the assist plugs 105 and 106 upwardly, to draw the sheet upwardly into the mold cavities. Any suitable means may be provided for effecting relative movement of the mold cavities and assist plugs and, as shown, in FIG. 7, a fluid operator 108 is connected to the platen 107 for raising and lowering the assist plug. As described in connection with the preceding embodiment, the assist plugs such as 105 and 106 are somewhat smaller than the mold cavity and include an end wall 111 and a marginal wall 112. The assist plugs are similarly contoured except that the plug 106 has a depression 113 contoured generally complementary to the protuberance 95 in the mold cavity 90.

In practice it has been found that the thickness of the bottom and side walls for the lower half of the carton can be properly controlled by the design of the assist plug 106 and that it is unnecessary to transfer additional material to a corner of the carton to enable forming of the depression 20a in the lower half 22 of the carton. However, a somewhat different condition exists in connection with forming the spout 20 on the carton, and, in order to provide adequate strength and rigidity, it is ncessary to shift material from one area of the sheet to the area which forms the spout.

In this embodiment, a laterally movable plug element 115 is mounted, as by a generally L-shaped bracket 116 for lateral movement relative to the assist plug 105. The L-shaped bracket 116 is conveniently slidably supported in guideways 117 formed on the inside of the assist plug and projects through a slot 118 in the end wall 111. The plug element 115 is arranged to engage the sheet 26 of material in the central portion thereof which normally forms the end wall 23 of the carton and, advantageously, the plug element is arranged for movement in a direction generally diagonally of the plug to transfer this material to the corner in which the spout is located. As in the preceding embodiment, the plug element 115 has a cup face 121 at its outer end which is connected through passages 122 and a conduit 123 to a suitable control valve and vacuum pump. Any suitable means may be provided for shifting the plug element 115 relative to the assist plug in timed relation with the movement of the later and, as best shown in FIG. 11, a lever 125 is pivotally mounted on a shaft 126 carried by the movable support platen 107 for the assist plug. One end 128 of the lever 125 engages a slot 129 in the bracket 116 to reciprocate the plug element 115 as the lever is oscillated. A second lever 131 is connected to the shaft 126 and has a follower 132 engageable with a cam track 133 disposed along the path of movement of the assist plug. As shown, the cam track includes a lower dwell portion 133a which receives the follower when the assist plug is in its lower position shown in FIG. 10. As the assist plug moves upwardly, the follower moves along the inclined portion 133b of the cam track and swings the lever 125 along the path indicated at p in FIG. 10. As the assist plug reaches the upper portion of its stroke, the follower 132 rides in the portion 133c of the cam track and the plug element 115 then moves straight upwardly into the spout forming recess 93 in the mold. The mold cavity is thereafter evacuated to draw the sheet off the assist plug and to press the same against the mold cavity to form and cool the latter.

Any suitable means may be provided for moving the plug and mold, and for applying vacuum to the plug element 115 and the mold chamber 96. As diagrammatically shown in FIG. 7, the fluid operators 102 and 108 are connected through conduits 141 and 142 to valves 143 and 144, and valves 145 and 146 are connected through conduits 98 and 123 to the cup 121 on the plug element and the vacuum chamber 96, respectively. Operation of the several valves is controlled by a sequence timer 150 or the like.

From the foregoing, it will be seen that the male mold member or assist plug includes a laterally movable plug element which engages the sheet in an area offset from the area which normally forms a protuberance, boss or reinforced area. The plug element is shifted laterally relative to the path of movement of the assist plug, to shift the engaged portion of the sheet and thereby effectively move material from one area of the sheet to another. In the embodiments illustrated, the movement of the plug element laterally of the assist plug has been made simultaneous with the movement of the assist plug into the mold cavity, and this aids in holding the sheet material against the laterally movable plug element. After the sheet is drawn into the mold cavity by the assist plug, and after the laterally movable plug element has completed shifting of material from one area of the sheet to the area from which the spout or protuberance is formed, the vacuum chamber is evacuated. This strips the sheet off the assist plug and presses the same against the female mold. The female mold is preferably maintained at a temperature below the softening temperature of the plastic to shape and cool the sheet.

The assist plug controls the general distribution of the sheet material between the side walls and end wall of the article and is shaped and proportioned relative to the mold cavity to draw the side walls to the desired thickness while maintaining the end wall thickness somewhat greater than the minimum necessary for adequate strength in that area. The laterally movable plug element shifts material from one area of the end wall to a relatively different area from which the protuberance is formed, to provide adequate material for forming the protuberance. By moving the assist plug into the sheet while the laterally movable plug element is being shifted laterally of the assist plug, the assist plug controls the area of the sheet in which the lateral shifting or movement of material occurs. Thus, in the apparatus disclosed wherein the laterally movable plug element engages the sheet in the area which forms the end wall of the article, the assist plug effectively inhibits stretching of the side wall portions of the article, due to movement of the plug element laterally of the assist plug.

In the embodiments illustrated, the male mold member or assist plug has a laterally movable portion or plug element which engages the sheet and shifts material from one area of the sheet to another. A vacuum is then applied to the female mold member to strip the sheet of the male mold member and to press the same against the female mold member for shaping of the article. Alternatively, the sheet could be formed around the male mold member. Thus, the male mold member such as 105 having the laterally movable element 115, could be formed in the shape of the article to be produced. As the male mold member is moved toward the sheet, the laterally movable element 115 would engage the sheet and shift material from one area of the sheet to another, as previously described. However, after the male member has been pushed into the sheet, pressure, instead of the vacuum previously described, would be applied through the female mold member to press the sheet against the male mold member to shape the article.

I claim:

1. In the method of shaping an article from a heat softened sheet of plastic material wherein at least a portion of the sheet is held against shifting in the plane of the sheet and the sheet is thereafter pressed against a mold to shape the sheet; the improvement which comprises gripping a portion of the sheet inwardly of the periphery before the sheet has been completely pressed against the mold and shifting the gripped portion in a direction having at least a substantial component paralleling the normal plane of the sheet to shift material from one area of the sheet to another, and thereafter releasing the gripped portion and pressing the sheet against the mold to shape and set the sheet.

2. In the method of shaping an article from a heat softened sheet of plastic material wherein at least a portion of the sheet is clamped against shifting in the plane of the sheet and fluid pressure is thereafter applied to press the sheet against a mold to shape the sheet; the improvement which comprises gripping a portion of the sheet inwardly of the periphery before fluid pressure is applied to press the sheet against the mold, and shifting the gripped portion in a direction having at least a substantial component paralleling the normal plane of the sheet of shift material from one area of the sheet to another, and thereafter releasing the gripped portion and subjecting the sheet to fluid pressure to press the sheet against the mold to shape and set the sheet.

3. The method of molding plastic articles from thermoplastic sheet material in which the articles have at least one protuberance projecting from the body of the article comprising, providing a mold having the shape of the article and its protuberance, clamping at least a portion of a thermoplastic sheet against shifting in the plane of the sheet, heating the sheet to forming temperature, gripping a portion of the sheet laterally offset in the plane of the sheet from the protuberance in the mold and shifting the gripped portion toward the protuberance forming portion of the mold, and thereafter applying fluid pressure to the sheet to press the sheet against the mold to shape and set the sheet.

4. The method of molding plastic articles from thermoplastic sheet material in which the articles have at least one protuberance projecting from the body of the article comprising, providing a mold having the shape of the article and its protuberance, clamping a portion of the sheet against shifting in the plane of the sheet, heating the sheet to forming temperature, gripping a portion of the sheet which is laterally offset in the plane of the sheet from the portion of the mold which forms the protuberance, shifting the gripped portion in a direction having at least a substantial component paralleling the normal plane of the sheet and toward the protuberance forming portion of the mold, and thereafter applying fluid pressure to the sheet to press the sheet against the mold to shape and set the sheet.

5. In the plug-assist method of molding an article from a heat softened sheet of plastic material wherein the plug and sheet are moved relative to each other in a direction transverse to the plane of the sheet to draw the sheet and the sheet is thereafter pressed by fluid pressure off the plug and into a mold; the improvement which comprises gripping a portion of the sheet before the sheet has been pressed into the mold and moving the gripped portion in a direction transverse to the direction of relative movement between the plug and sheet before the sheet has been completely pressed into the mold to shift material from one area of the sheet to another, and thereafter releasing the gripped portion and applying fluid pressure to the sheet to press the sheet off the plug and into the mold.

6. A plug-assist method of molding plastic articles from thermoplastic sheet material comprising, clamping the edges of the sheet to hold the same against shifting in the plane of the sheet, heating the sheet to forming temperature, moving a plug and the sheet relative to each other in a direction transverse to the sheet to produce a cup-like draw in area of the sheet, gripping a portion of said area of the sheet and moving the gripped portion in a direction transverse to said first direction to shift material from one part of said area of the sheet to another, and thereafter releasing the gripped portion and subjecting the sheet to fluid pressure to press a sheet off the plug and into the mold cavity to shape and set the sheet.

7. A method of molding plastic articles from thermoplastic sheet material employing a mold cavity having the shape of the article to be formed and an assist plug for drawing the sheet, said method comprising moving the plug and a heat softened sheet of plastic material relative to each other in a direction transverse to the sheet to produce a cup-like draw in an area of the sheet, gripping a portion of that part of the sheet and moving the gripped portion in a direction transverse to said first direction to shift material from one part of said area of the sheet to another and thereafter releasing the gripped portion and subjecting the sheet to fluid pressure to press the sheet off the plug and into the mold cavity to shape and set the sheet.

8. A method of molding plastic articles from thermoplastic sheet material employing a mold cavity having the shape of the article to be formed and an assist plug for drawing the sheet, said method comprising moving the plug and a heat softened sheet of plastic material relative to each other in a direction transverse to the sheet to produce a cup-like draw in an area of the sheet, gripping a portion of that part of the sheet and moving the gripped portion in a direction transverse to said first direction to shift material from one part of said area of the sheet to another simultaneous with the movement of the plug, and thereafter releasing the gripped portion and subjecting the sheet to fluid pressure to press the sheet off the plug and into the mold cavity to shape and set the sheet.

9. A method of molding plastic articles from thermoplastic sheet material employing a mold cavity having the shape of the article to be formed and an assist plug having a main plug portion and a laterally movable plug portion, said method comprising, heating the sheet of thermoplastic material to soften the same, moving the main plug portion and the laterally movable plug portion of the assist plug in a direction transverse to the sheet to engage the sheet and draw a cup-like form in the sheet, moving the laterally movable plug portion relative to the main plug portion in a direction transverse to the direction of movement of the main plug portion to shift a portion of the sheet laterally, and thereafter stripping the sheet off the assist plug and pressing the same into the mold cavity to form and cool the sheet.

10. An apparatus for forming articles from a sheet of heat softened thermoplastic material comprising, a mold having a main cavity and a relatively smaller protuberance forming depression in one area of the cavity, a plug, means on the plug for gripping a portion of the sheet, means for moving the plug relative to the sheet in a direction transverse to the sheet into engagement with the sheet at an area laterally offset in the plane of the sheet from the protuberance forming depression in the cavity and for thereafter moving the plug along a path toward said protuberance forming depression to draw the sheet into the cavity, and means for stripping the sheet off the plug and for pressing the sheet into the mold cavity to form and cool the same.

11. The combination of claim 10 wherein said means on the plug for gripping the sheet includes a vacuum cup on the plug.

12. An appartaus for forming articles from a heat softened sheet of thermoplastic material comprising, a female mold member open at one side and defining a cavity, clamp means engageable with the sheet of thermoplastic material for supporting the sheet, a male mold member, means for effecting relative movement between the male and female mold members in a direction transverse to the sheet, vacuum operated gripper means on one of the mold members for gripping a portion of the sheet and movable in a direction transverse to said first direction for shifting material from one area of the sheet to another, and means for applying fluid pressure to the sheet to press the sheet against one of the mold members.

13. An apparatus for forming articles from a heat softened sheet of thermoplastic material comprising, a mold open at one side and having a cavity for shaping the article, clamp means engageable with the sheet of thermoplastic material for supporting the sheet at the open end of the mold, a plug for drawing the sheet into the mold, means for effecting relative movement between the mold and plug in a direction transverse to the sheet to draw the sheet into the mold, means extending from the sheet engaging face of said plug for engagement with the sheet and movable in a direction transverse to said first direction for shifting material from one area of the sheet to another, and means for applying fluid pressure to said sheet to press the sheet off the plug and into the mold.

14. An apparatus for forming articles from a heat softened sheet of thermoplastic material comprising, clamp means engageable with the sheet of thermoplastic material for supporting the sheet against shifting, a male mold member, means for effecting relative movement between the male mold member and the sheet in a direction transverse to the sheet, said male mold member including a main body portion and at least one movable portion mounted for movement relative to the main body portion in a direction transverse to said first mentioned direction, means including a vacuum cup on said movable portion for gripping a portion of the sheet to shift said gripped portion of the sheet relative to the main portion of the sheet.

15. An apparatus for forming articles from a heat softened sheet of thermoplastic material comprising, a mold open at one side and having a cavity for shaping the article, means for supporting a sheet of material, an assist plug mounted for movement transverse to the sheet to draw a cup-like form in the sheet, a plug element mounted on the assist plug for movement therewith and for movement relative to the assist plug in a direction transverse to the direction of movement of the assist plug, said plug element having a sheet engaging head extending outwardly of the assist plug, means for moving the assist plug in a first direction transverse to said sheet, means for moving said plug element relative to said assist plug in a direction transverse to said first direction, and means for applying pressure to said sheet to strip the sheet off the assist plug and press it into the mold cavity.

16. An apparatus for forming articles from a heat softened sheet of thermoplastic material comprising, a mold open at one side and having a cavity for shaping the article, means for supporting a sheet of material, an assist plug mounted for movement transverse to the sheet to draw a cup-like form in the sheet, a plug element mounted on the assist plug for movement therewith and for movement relative to the assist plug in a direction transverse to the direction of movement of the assist plug, said plug element having a sheet engaging head extending outwardly of the assist plug, means for moving the assist plug in a first direction transverse to said sheet, means for moving said plug element relative to said assist plug in a direction transverse to said first direction, means including a vacuum cup on said sheet engaging head for gripping a portion of the sheet to move the gripped portion with said plug element.

17. The combination of claim 16 wherein said plug element is mounted for swinging movement on said assist plug in a direction crosswise of the path of movement of said assist plug.

18. The combination of claim 16 wherein said plug element is mounted for sliding movement on said assist plug in a direction crosswise of the path of movement of said assist plug.

19. An apparatus for forming articles from a sheet of heat softened thermoplastic material comprising, a mold defining a cavity having an end wall and marginal side walls and a protuberance forming recess adjacent one end of the cavity, an assist plug having an end wall and side walls and dimensioned smaller than said cavity, means for supporting a sheet of plastic material, means for moving the assist plug transverse to the sheet to draw a cup-like form in the sheet, a plug element mounted on the assist plug for movement relative thereto in a direction transverse to the direction of movement of the plug element, said plug element having a head extending through said end wall of the assist plug and defining a vacuum cup for engaging and gripping the portion of the sheet that overlies said end wall of the plug element, means for moving the plug element relative to the assist plug to shift the engaged portion of the sheet relative to the plug and into said protuberance forming recess in the mold, and means for applying fluid pressure to the sheet to press it off the assist plug and into the mold.

20. The combination of claim 19 wherein said mold cavity has corners and said depression is located adjacent one corner, said plug element being movable in a direction generally diagonally of said assist plug to move material into said corner of the mold.

References Cited by the Examiner

UNITED STATES PATENTS

| | | | |
|---|---|---|---|
| 2,282,423 | 5/42 | Kopitke | 18—19 |
| 2,937,403 | 5/60 | Keith | 18—56 |
| 2,974,366 | 3/61 | Bauman | 18—56 |

OTHER REFERENCES

Thermoforming Techniques for High Density Polyolefin Sheet, Modern Plastics, vol. 38, No. 10, June 1961. p. 124–25.

ALEXANDER H. BRODMERKEL, *Primary Examiner.*

UNITED STATES PATENT OFFICE
CERTIFICATE OF CORRECTION

Patent No. 3,172,927                       March 9, 1965

Albert B. Mojonnier

It is hereby certified that error appears in the above numbered patent requiring correction and that the said Letters Patent should read as corrected below.

Column 9, line 30, before "area" insert -- an --; line 35, for "a" read -- the --; line 36, for "the", second occurrence, read -- a --.

Signed and sealed this 27th day of July 1965.

(SEAL)
Attest:

RNEST W. SWIDER
:testing Officer

EDWARD J. BRENNER
Commissioner of Patents